US010125230B2

(12) United States Patent
Prissok et al.

(10) Patent No.: US 10,125,230 B2
(45) Date of Patent: Nov. 13, 2018

(54) POLYURETHANE COMPOSITE SYSTEM HAVING HIGH COMPRESSIVE STRENGTH AND RIGIDITY

(75) Inventors: Frank Prissok, Lemfoerde (DE); Marco Balbo Block, Osnabrueck (DE); Florian Felix, Garmisch-Partenkirchen (DE)

(73) Assignee: BASF SE, Ludwigshafen (DE)

( * ) Notice: Subject to any disclaimer, the term of this patent is extended or adjusted under 35 U.S.C. 154(b) by 948 days.

(21) Appl. No.: 13/516,880

(22) PCT Filed: Dec. 16, 2010

(86) PCT No.: PCT/EP2010/069907
§ 371 (c)(1),
(2), (4) Date: Jun. 18, 2012

(87) PCT Pub. No.: WO2011/073325
PCT Pub. Date: Jun. 23, 2011

(65) Prior Publication Data
US 2012/0263937 A1    Oct. 18, 2012

(30) Foreign Application Priority Data
Dec. 18, 2009   (EP) .................................... 09179965

(51) Int. Cl.
| C08J 5/04 | (2006.01) |
| B29C 44/12 | (2006.01) |
| C08K 7/14 | (2006.01) |
| C09D 175/02 | (2006.01) |
| C08G 18/50 | (2006.01) |
| C08G 18/66 | (2006.01) |
| C08J 9/00 | (2006.01) |
| C08J 9/36 | (2006.01) |
| C08G 18/32 | (2006.01) |
| C08G 18/40 | (2006.01) |
| C08G 18/42 | (2006.01) |
| C08G 18/48 | (2006.01) |
| B29K 75/00 | (2006.01) |
| B29K 105/12 | (2006.01) |
| B29L 9/00 | (2006.01) |
| C08L 75/04 | (2006.01) |
| C08G 101/00 | (2006.01) |

(52) U.S. Cl.
CPC ........... *C08J 5/043* (2013.01); *B29C 44/1209* (2013.01); *C08G 18/324* (2013.01); *C08G 18/4018* (2013.01); *C08G 18/4211* (2013.01); *C08G 18/4816* (2013.01); *C08G 18/5024* (2013.01); *C08G 18/6674* (2013.01); *C08G 18/6685* (2013.01); *C08J 9/0085* (2013.01); *C08J 9/365* (2013.01); *C08K 7/14* (2013.01); *C09D 175/02* (2013.01); *B29K 2075/00* (2013.01); *B29K 2105/12* (2013.01); *B29L 2009/00* (2013.01); *C08G 2101/005* (2013.01); *C08G 2101/0025* (2013.01); *C08J 2205/10* (2013.01); *C08J 2375/04* (2013.01); *C08J 2475/04* (2013.01); *C08L 75/04* (2013.01); *Y10T 428/249969* (2015.04); *Y10T 428/249981* (2015.04)

(58) Field of Classification Search
None
See application file for complete search history.

(56) References Cited

U.S. PATENT DOCUMENTS

| 3,328,198 | A | * | 6/1967 | Koller | .................... C08J 9/0085 |
| | | | | | 442/359 |
| 4,110,508 | A | * | 8/1978 | Isgur et al. | ............... B32B 5/24 |
| | | | | | 427/180 |
| 4,242,410 | A | * | 12/1980 | Konig et al. | ................ 428/319.7 |
| 4,310,632 | A | * | 1/1982 | Horacek | ............ C08G 18/1883 |
| | | | | | 521/121 |
| 4,828,910 | A | * | 5/1989 | Haussling | ...................... 442/391 |
| 5,686,500 | A | * | 11/1997 | Fishback et al. | ............. 521/129 |
| 6,423,755 | B1 | * | 7/2002 | Allen et al. | .................... 521/111 |
| 2002/0137871 | A1 | | 9/2002 | Wheeler, Jr. et al. | |
| 2006/0284330 | A1 | * | 12/2006 | De Winter et al. | .......... 264/46.5 |
| 2008/0166508 | A1 | * | 7/2008 | Edwards | ..................... 428/34.1 |
| 2008/0299372 | A1 | | 12/2008 | Stidham et al. | |

FOREIGN PATENT DOCUMENTS

| DE | 39 13 400 | 10/1990 |
| DE | 198 08 026 | 9/1999 |
| DE | 100 00 767 | 7/2001 |
| DE | 10000767 A1 * | 7/2001 |
| DE | 10 2004 022 683 | 11/2005 |

OTHER PUBLICATIONS

Partusch et al., Bodywork Outer Element for Vehicles, Jul. 12, 2001, machine translation of DE 10000767.*
International Search Report dated Mar. 1, 2011 in PCT/EP10/69907 Filed Dec. 16, 2010.

* cited by examiner

*Primary Examiner* — Chinessa T. Golden
(74) *Attorney, Agent, or Firm* — Oblon, McClelland, Maier & Neustadt, L.L.P.

(57) ABSTRACT

The present invention relates to a polyurethane composite system comprising a rigid polyurethane foam and a coating material composed of a compact polyurethane or a compact polyurea, wherein the rigid polyurethane foam comprises a porous three-dimensional reinforcing material which forms a network, where the network encloses at least 50% of the volume of the rigid polyurethane foam, or at least two layers of a porous, at least two-dimensional reinforcing material. The present invention further relates to a process for producing the polyurethane composite system and also a sports article, cladding part or furniture item comprising such a polyurethane composite system.

17 Claims, No Drawings

POLYURETHANE COMPOSITE SYSTEM HAVING HIGH COMPRESSIVE STRENGTH AND RIGIDITY

CROSS REFERENCE TO RELATED APPLICATION

This application is a 371 of PCT/EP2010/069907, filed on Dec. 16, 2010, and claims priority to European Patent Application 09179965.0, filed on Dec. 18, 2009.

The present invention relates to a polyurethane composite system comprising a rigid polyurethane foam and a coating material composed of a compact polyurethane or a compact polyurea, wherein the rigid polyurethane foam comprises a porous three-dimensional reinforcing material which forms a network, where the network encloses at least 50% of the volume of the rigid polyurethane foam, or at least two layers of a porous, at least two-dimensional reinforcing material. The present invention further relates to a process for producing the polyurethane composite system and also a sports article, cladding part or furniture item comprising such a polyurethane composite system.

Composites based on a rigid polyurethane foam coated with a coating material are known in many fields. Coating is usually carried out by foaming a rigid polyurethane foam in a prefabricated housing or producing a rigid polyurethane foam which is subsequently joined to a covering layer. In the first case, these are used, for example, as bumpers in automobiles or as cooling boxes or refrigerator housings, and in the second case are used, with a coating of metal sheets provided with a surface coating, as exterior wall cladding. A great advantage of these low-density composites is their low weight combined with some mechanical stability. A further advantage is the individuality of the material. Thus, the desired article can be produced individually from a block of rigid polyurethane foam and subsequently be provided with a coating.

Disadvantages of low-density foams are their low compressive strength, low compressive strength and also an only moderate core stiffness and low flexural strength. If a high stiffness and compressive strength and at the same time a low weight of the material is required, for example for sports articles such as surfboards, winter sports equipment, small sports boats or tennis rackets, furniture items, parts of aircraft such as ailerons or rudders, blades of wind turbines or cladding parts in vehicle construction or in the building industry, the rigid polyurethane foams are stiffened by means of stiffening materials. These are, for example, parts composed of wood or metal and also resin-reinforced fiberglass mats. These reinforcing parts are, for example, laid in milled depressions in the rigid polyurethane foam or applied to the surface of the latter.

To improve the stiffness further and also to improve the compressive strength, the surface of the rigid polyurethane foams is covered with compact coating materials. These coatings can be inflexible, high-stiffness materials such as metal or polystyrene boards or partially flexible materials such as multiple layers of fiberglass mats impregnated with epoxy resin. To obtain a surface having a high surface quality, each layer of the fiberglass mats impregnated with epoxy resin has to be ground after drying.

After application of usually 2 or 3 layers of fiberglass mats, these are ground flat, provided with a surface coating, optionally provided with a printed design and a clear finish and also optionally tread areas, handles and fastening elements. This process is very time-consuming and labor intensive and the use of inserts and coating by a number of layers of fiberglass mats impregnated with epoxy resin partly cancels out the advantage of the low weight of the composite. Furthermore, epoxy resin is relatively expensive.

Coated polyurethane spray foams composed of a rigid polyurethane foam comprising a short fiber material as reinforcing material and a polyurea coating are also known. These composite systems are produced by at least one component of the reaction mixture for producing the rigid polyurethane foam already comprising the reinforcing material before mixing or by spraying the reinforcing material together with reaction mixture into a mold. Such composites are described, for example, in US 2002/0137871 or US 2008/299372. A disadvantage of these composites is that only small improvements in the mechanical properties, in particular the flexural strength, are obtained. Furthermore, production is tied to the shape of the mold and individual shaping of the composite is therefore not possible.

It was an object of the present invention to provide a polyurethane composite system based on a rigid polyurethane foam, which system has improved stiffness and compressive strength at a reduced total weight and is easy to produce. A further object was to provide a process which allows flexible variations of the final shape/configuration of the composite system.

The object of the invention is achieved by a polyurethane composite system comprising a rigid polyurethane foam and a coating material composed of a compact polyurethane or a compact polyurea, wherein the rigid polyurethane foam comprises a porous three-dimensional reinforcing material which forms a network, where the network encloses at least 50% of the volume of the rigid polyurethane foam, or at least two layers of a porous, at least two-dimensional reinforcing material.

If a plurality of layers are used, these are preferably distributed homogeneously in the rigid polyurethane foam. In this context, homogeneously distributed means that the maximum distance between two adjacent layers among one another or between the upper layer and the upper side of the foam or between the lower layer and the underside of the foam differs from the minimum distance between two layers among one another or between the upper layer and the upper side of the foam or between the lower layer and the underside of the foam by a factor of not more than 4, preferably not more than 2 and in particular not more than 1.5.

The reinforced rigid foam used in the polyurethane composite system of the invention has a density-independent compressive strength of at least $5*10^{-4}$ MPa*(l/g)$^{1.6}$, preferably at least $5.5*10^{-4}$ MPa*(l/g)$^{1.6}$, and a density-independent compressive E modulus of at least $8*10^{-3}$ MPa*(l/g)$^{1.7}$, preferably at least $9.5*10^{-3}$ MPa/(l/g)$^{1.7}$. The density-independent compressive strength was calculated as compressive strength*(density)$^{-1.6}$ and the density-independent compressive E modulus was calculated as compressive E modulus*(density)$^{-1.7}$. For a reinforced rigid foam used in the polyurethane composite system of the invention, this means, at a foam density of 45 g/l, a compressive strength of at least 0.2 MPa, preferably at least 0.25 MPa, and a compressive E modulus of at least 5 MPa, preferably at least 6 MPa. Furthermore, at a density of 45 g/l, the rigid foam has a flexural strength of at least 0.4 MPa, preferably at least 0.5 MPa. The polyurethane composite system of the invention has, at a foam density of 45 g/l and a layer thickness of the coating material of 1 mm, a surface hardness of at least 400 N, preferably at least 500 N. The reinforced rigid polyurethane foam used according to the invention has a density of from 30 g/l to 500 g/l, preferably from 40 g/l to 400 g/l, particularly preferably from 40 g/l to 300 g/l and in particular from 40 g/l to 200 g/l, for example from 40 g/l to 100 g/l, e.g. from 40 g/l to 60 g/l.

For the purposes of the present invention, a reinforcing material is referred to as porous when the reaction mixture for producing the rigid polyurethane foam can penetrate into the reinforcing material and can permeate and completely wet the reinforcing material. The reinforcing material forms two-dimensional or three-dimensional networks in the rigid polyurethane foam of the polyurethane composite system of the invention. The materials which form the network, for example fibers, rovings or tapes, are preferably joined to one another, for example by intermeshing or bonds. To form three-dimensional reinforcing materials, a plurality of two-dimensional reinforcing materials can be joined. Furthermore, twisted or braided fiber skeins, e.g. fiber plaits, can be used as three-dimensional reinforcing material.

The reinforcing materials can comprise, for example, glass fibers, aramid fibers, carbon fibers or polymer fibers. It is also possible for the reinforcing materials to comprise a combination of these materials. Thus, for example, a three-dimensional reinforcing material can comprise two fiberglass mats which are joined by polyamide fibers.

The reinforcing material is used in at least two layers. Only when the three-dimensional network encloses at least 50% of the volume of the rigid polyurethane foam can only one three-dimensional reinforcing material also be used.

Such two- or three-dimensional networks are obtained, for example, by the use of lay-ups, woven meshes or knitted structures based on fibers. Such two-dimensional reinforcing materials are preferably fiber mats, for example textile, fiberglass or carbon fiber mats, or tapes, preferably fiberglass mats, for example Unifilo® U801 or U809 from Owens Corning Vetrotex. Fiberglass roving mats can also be used.

The proportion of reinforcing material is preferably from 5 to 40 percent by weight, in particular 10-20 percent by weight, based on the total weight of the rigid polyurethane foam including reinforcing material.

The rigid polyurethane foam according to the invention is preferably obtained by mixing (a) isocyanates, (b) compounds having groups which are reactive toward isocyanates, (c) blowing agents, comprising water, (d) catalysts and optionally (e) further additives to form a reaction mixture, applying the reaction mixture to a reinforcing material and curing the reaction mixture. For this purpose, the layers of the reinforcing material are made ready and the polyurethane reaction mixture is applied to these layers of the reinforcing material. The reaction mixture impregnates the reinforcing material essentially completely and as a result of the blowing reaction in the polyurethane reaction mixture, the various layers of the reinforcing material or the network of the three-dimensional reinforcing material are distributed homogeneously in the foam, i.e. as a result of the blowing reaction of the polyurethane reaction mixture, the reinforcing material which has been essentially completely impregnated with the reaction mixture is expanded and stretched in such a way that the network formed by the three-dimensional reinforcing material encloses at least 50% of the volume of the rigid polyurethane foam.

As isocyanates (a), it is possible to use all customary aliphatic, cycloaliphatic and preferably aromatic diisocyanates and/or polyisocyanates. These preferably have a viscosity of less than 600 mPas, particularly preferably less than 500 mPas and in particular less than 350 mPas, measured at 25° C. As preferred isocyanates, it is possible to use tolylene diisocyanate (TDI) and diphenylmethane diisocyanate (MDI) and particularly preferably mixtures of diphenylmethane diisocyanate and polymeric diphenylmethane diisocyanate (PMDI). These particularly preferred isocyanates can be entirely or partially modified with uretdione, carbamate, isocyanurate, carbodiimide, allophanate and preferably urethane groups.

Furthermore, prepolymers and mixtures of the above-described isocyanates and prepolymers can be used as isocyanate component. These prepolymers are prepared from the above-described isocyanates and the polyethers, polyesters or both described below and have an NCO content of usually from 14 to 32% by weight, preferably from 22 to 30% by weight.

As compounds (b) having groups which are reactive toward isocyanates, it is possible to use all compounds which have at least two groups which are reactive toward isocyanates, e.g. OH, SH-, NH- and CH-acidic groups. It is usual to use polyetherols and/or polyesterols having from 2 to 8 hydrogen atoms which are reactive toward isocyanate. The OH number of these compounds is usually in the range from 30 to 850 mg KOH/g, preferably in the range from 80 to 600 mg KOH/g.

The polyetherols are obtained by known methods, for example by anionic polymerization of alkylene oxides with addition of at least one starter molecule which comprises from 2 to 8, preferably from 2 to 6, reactive hydrogen atoms in bound form in the presence of catalysts. As catalysts, it is possible to use alkali metal hydroxides such as sodium or potassium hydroxide or alkali metal alkoxides such as sodium methoxide, sodium or potassium ethoxide or potassium isopropoxide, or in the case of cationic polymerization Lewis acids such as antimony pentachloride, boron trifluoride etherate or bleaching earth. Furthermore, double metal cyanide compounds, known as DMC catalysts, can also be used as catalysts.

As alkylene oxides, preference is given to using one or more compounds having from 2 to 4 carbon atoms in the alkylene radical, e.g. tetrahydrofuran, 1,3-propylene oxide, 1,2- or 2,3-butylene oxide, in each case alone or in the form of mixtures, and preferably ethylene oxide and/or 1,2-propylene oxide.

Possible starter molecules are, for example, ethylene glycol, diethylene glycol, glycerol, trimethylolpropane, pentaerythritol, sugar derivatives such as sucrose, hexitol derivatives such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3,-propanediamine, 1,6-hexanediamine, ethanolamine, diethanolamine, triethanolamine and also other dihydric or polyhydric alcohols or monofunctional or polyfunctional amines.

The polyester alcohols used are usually prepared by condensation of polyfunctional alcohols having from 2 to 12 carbon atoms, e.g. ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned.

As further starting materials in the preparation of the polyesters, it is also possible to make concomitant use of hydrophobic substances. The hydrophobic substances are water-insoluble substances which comprise a nonpolar organic radical and have at least one reactive group selected from among hydroxyl, carboxyl, carboxylic ester or mixtures thereof. The equivalent weight of the hydrophobic materials is preferably in the range from 130 to 1000 g/mol. It is possible to use, for example, fatty acids such as stearic acid, oleic acid, palmitic acid, lauric acid or linoleic acid and also fats and oils, for example castor oil, maize oil, sunflower oil, soybean oil, coconut oil, olive oil or tall oil. If polyesters comprise hydrophobic substances, the proportion of the hydrophobic substances in the total monomer content of the polyester alcohol is preferably from 1 to 30 mol %, particularly preferably from 4 to 15 mol %.

The polyesterols used preferably have a functionality of from 1.5 to 5, particularly preferably 1.8-3.5 and in particular from 1.9 to 2.2.

Furthermore, the compound having groups which are reactive toward isocyanates preferably comprises (b) chain extenders and/or crosslinkers. Chain extenders and/or crosslinkers used are, in particular, bifunctional or trifunctional amines and alcohols, in particular diols, triols or both, in each case having molecular weights of less than 350 g/mol, preferably from 60 to 300 g/mol and in particular from 60 to 250 g/mol. Here, the bifunctional compounds are referred to as chain extenders and trifunctional or higher-functional compounds are referred to as crosslinkers. Possibilities are, for example, aliphatic, cycloaliphatic and/or aromatic diols having from 2 to 14, preferably from 2 to 10, carbon atoms, e.g. ethylene glycol, 1,2-, 1,3-propanediol, 1,2-, 1,3-pentanediol, 1,10-decanediol, 1,2-, 1,3-, 1,4-dihydroxycyclohexane, diethylene and triethylene glycol, dipropylene and tripropylene glycol, 1,4-butanediol, 1,6-hexanediol and bis (2-hydroxyethyl)hydroquinone, triols such as 1,2,4-, 1,3,5-trihydroxycyclohexane, glycerol and trimethylolpropane, and low molecular weight hydroxyl-comprising polyalkylene oxides based on ethylene oxide and/or 1,2-propylene oxide and the abovementioned diols and/or triols as starter molecules.

The compound (b) having groups which are reactive toward isocyanates preferably comprises a polyetherol (b1) having a functionality of 4 or more and a viscosity at 25° C. of 10 000 mPas or less and a polyetherol (b2) having a functionality of 3.5 or less, preferably 3 or less, and a viscosity at 25° C. of 600 mPas or less, preferably 500 mPas or less. The compound (b) having groups which are reactive toward isocyanates particularly preferably comprises not only the polyetherols (b1) and (b2) but also a polyesterol (b3) having a viscosity at 25° C. of 2000 mPas or less, a chain extender (b4) and optionally a crosslinker (b5).

As components (b1) to (b5), it is in each case possible to use individual compounds or mixtures, with each of the compounds used coming within the definition of (b1) to (b5).

The chain extender (b4) can be an individual compound or a mixture. The chain extender (b4) preferably comprises dipropylene glycol, tripropylene glycol and/or 2,3-butanediol either alone or optionally in admixture with one another or with further chain extenders.

In a further embodiment, the compounds (b) having groups which are reactive toward isocyanates comprise not only the polyetherol (b1), the polyetherol (b2), the polyesterol (b3) and the chain extender (b4) but also a crosslinker (b5). As crosslinker, preference is given to using 1,2,4-, 1,3,5-trihydroxycyclohexane, glycerol and/or trimethylolpropane. Preference is given to using glycerol as crosslinker.

The proportion of the component (b1) is preferably from 25 to 70% by weight, particularly preferably from 25 to 55% by weight and in particular from 30 to 50% by weight, based on the total weight of the component (b).

The proportion of the component (b2) is preferably from 10 to 40% by weight, particularly preferably from 15 to 35% by weight, based on the total weight of the component (b).

The proportion of the component (b3) is preferably from 15 to 50% by weight, particularly preferably from 20 to 40% by weight, based on the total weight of the component (b).

The proportion of chain extender (b4) in the component (b) is preferably from 1 to 30% by weight, particularly preferably from 5 to 20% by weight, based on the total weight of the component (b).

The proportion of the component (b5) in the component (b) is preferably from 0 to 10% by weight, particularly preferably from 1 to 5% by weight, based on the total weight of the component (b).

The proportion of the polyetherols (b1), (b2), (b3), (b4) and optionally (b5) in the compound (b) having groups which are reactive toward isocyanates is preferably at least 80% by weight, particularly preferably at least 90% by weight and in particular 100% by weight, based on the total weight of the compound (b) having groups which are reactive toward isocyanates.

The overall functionality of the component (b) is preferably greater than 2.5, particularly preferably greater than 2.6 and in particular greater than 2.75. The average OH number of the component (b) is preferably greater than 300 mg KOH/g, particularly preferably in the range from 350 to 1000 mg KOH/g and in particular from 400 to 600 mg KOH/g.

If isocyanate prepolymers are used as isocyanates (a), the content of compounds (b) having groups which are reactive toward isocyanates is calculated inclusive of the compounds (b) having groups which are reactive toward isocyanates which are used for preparing the isocyanate prepolymers.

As blowing agent (c), use is made of blowing agent comprising water. Here, water can be used either alone or in combination with further blowing agents. The content of water in the blowing agent (c) is preferably greater than 40% by weight, particularly preferably greater than 60% by weight and very particularly preferably greater than 80% by weight, based on the total weight of the blowing agent (c). In particular, water is used as sole blowing agent. If further blowing agents are used in addition to water, it is possible to use, for example, chlorofluorocarbons, fluorinated hydrocarbons, hydrocarbons, acids and/or liquid or dissolved carbon dioxide. Blowing agents (c) preferably comprise less than 50% by weight, more preferably less than 20% by weight, particularly preferably less than 10% by weight and in particular 0% by weight, based on the total weight of the blowing agent (c), of chlorofluorocarbons, fluorinated hydrocarbons and/or hydrocarbons. In a further embodiment, a mixture of water and formic acid and/or carbon dioxide can be used as blowing agent (c). To be able to disperse the blowing agent more readily in the polyol component, the blowing agent (c) can be mixed with polar compounds such as dipropylene glycol.

The blowing agents (c) are used in such an amount that the density of the rigid polyurethane foam formed by reaction of the components (a) to (e) including reinforcing materials is in the range 30-500 g/l, preferably 40-400 g/l, particularly preferably from 40 to 300 g/l and in particular from 40 to 200 g/l, for example from 40 g/l to 100 g/l, e.g. from 40 g/l to 60 g/l.

As catalysts (d), it is possible to use all compounds which accelerate the isocyanate-water reaction or the isocyanate-polyol reaction. Such compounds are known and are described, for example, in "Kunststoffhandbuch, Volume 7, Polyurethane", Carl Hanser Verlag, $3^{rd}$ edition 1993, chapter 3.4.1. These include amine-based catalysts and catalysts based on organic metal compounds.

As catalysts based on organic metal compounds, it is possible to use, for example, organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or alkali metal salts of carboxylic acids, e.g. potassium acetate or potassium formate.

Preference is given to using a mixture comprising at least one tertiary amine as catalyst (d). These tertiary amines are usually compounds which can also bear groups which are reactive toward isocyanate, e.g. OH, NH or $NH_2$ groups. Some of the most frequently used catalysts are bis(2-dimethylaminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicyloundecene and diazabicyclononene. Preference is given to using mixtures comprising at least two different tertiary amines as catalysts (d). The catalyst mixture (d) particularly preferably comprises dimethylcyclohexylamine (d1) and bis(2-dimethylaminoethyl) ether (d2) or dimethylcyclohexylamine (d1) and N,N,N,N,N-pentamethyldiethylenetriamine (d3). The ratio of dimethylcyclohexylamine (d1) to amine (d2) and/or of dimethylcyclohexylamine (d1) to amine (d3) is preferably 0.25-4:1, particularly preferably 0.5-2:1. Particularly when using the polyurethane composite systems according to the invention in enclosed spaces, for example in the interior of vehicles, it is also possible to use alternative catalysts by means of which emissions can be reduced. Such catalysts are, for example, incorporatable catalysts. It is also possible to dispense with catalysts entirely.

As reinforcing materials, it is possible to use all the abovementioned reinforcing materials.

As further additives (e), it is possible to use flame retardants, plasticizers, foam stabilizers, further fillers and other additives such as antioxidants.

As flame retardants, it is generally possible to use the flame retardants known from the prior art. Suitable flame retardants are, for example, brominated ethers (Ixol B 251), brominated alcohols such as dibromoneopentyl alcohol, tribromoneopentyl alcohol and PHT-4-diol and also chlorinated phosphates such as tris(2-chloroethyl) phosphate, tris (2-chloroisopropyl) phosphate (TCPP), tris(1,3-dichloroisopropyl) phosphate, tris(2,3-clbromopropyl) phosphate and tetrakis(2-chloroethyl) ethylenediphosphate, or mixtures thereof.

Apart from the abovementioned halogen-substituted phosphates, it is also possible to use inorganic flame retardants, such as red phosphorus, preparations comprising red phosphorus, expandable graphite, aluminum oxide hydrate, antimony trioxide, arsenic oxide, ammonium polyphosphate and calcium sulfate or cyanuric acid derivatives such as melamine or mixtures of at least two flame retardants such as ammonium polyphosphates and melamine and also optionally starch for making the rigid polyurethane foams produced according to the invention flame resistant.

As further liquid halogen-free flame retardants, it is possible to use diethyl ethanephosphonate (DEEP), triethyl phosphate (TEP), dimethyl propylphosphonate (DMPP), diphenyl cresyl phosphate (DPC) and others.

For the purposes of the present invention, the flame retardants are preferably used in an amount of from 0 to 25% by weight, based on the total weight of the components (b) to (e).

Foam stabilizers are substances which promote the formation of a regular cell structure during foam formation. Examples which may be mentioned are: silicone-comprising foam stabilizers such as siloxane-oxyalkylene copolymers and other organopolysiloxanes. Also alkoxylation products of fatty alcohols, oxo alcohols, fatty amines, alkylphenols, dialkylphenols, alkyicresols, alkylresorcinol, naphthol, alkylnaphthol, naphthylamine, aniline, alkylaniline, toluedine, bisphenol A, alkylated bisphenol A, polyvinyl alcohol and also alkoxylation products of condensation products of formaldehyde and alkylphenols, formaldehyde and dialkylphenols, formaldehyde and alkyicresols, formaldehyde and alkylresorcinol, formaldehyde and aniline, formaldehyde and toluedine, formaldehyde and naphthol, formaldehyde and alkylnaphthol and also formaldehyde and bisphenol A or mixtures of two or more of these foam stabilizers.

Foam stabilizers are preferably used in an amount of from 0.5 to 4% by weight, particularly preferably from 1 to 3% by weight, based on the total weight of the components (b) to (e).

Further fillers, in particular reinforcing fillers, are the customary organic and inorganic fillers, reinforcing materials, etc., known per se. Specific examples are: inorganic fillers such as siliceous minerals, for example sheet silicates such as antigorite, serpentine, hornblendes, amphiboles, chrysotile, talc; metal oxides, such as kaolin, aluminum oxides, titanium oxides and iron oxides, metal salts such as chalk, barite and inorganic pigments such as cadmium sulfide, zinc sulfide and also glass and others. Preference is given to using kaolin (China clay), aluminum silicate and coprecipitates of barium sulfate and aluminum silicate and also natural and synthetic fibrous minerals such as wollastonite, metal fibers and in particular glass fibers of various lengths which may be coated with a size. It is also possible to use hollow glass microspheres. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and carbon fibers.

The inorganic and organic fillers can be used individually or as mixtures and are advantageously added to the reaction mixture in amounts of from 0.5 to 30% by weight, preferably from 1 to 15% by weight, based on the weight of the components (a) to (e).

The rigid polyurethane foam according to the invention is preferably produced as slabstock foam either continuously on a belt or discontinuously in a mold. For this purpose, the components (b) to (d) and, if appropriate, (e) are mixed to form a polyol component. This is subsequently mixed with the isocyanate component (a), preferably in a low-pressure mixing apparatus, a high-pressure mixing apparatus at a reduced pressure of less than 100 bar or a high-pressure machine. As an alternative, the components (a) to (d) and optionally (e) can also each be introduced individually into the mixing apparatus. The reaction mixture obtained in this way is subsequently applied to the reinforcing material, preferably to the fiberglass mats or fiberglass plait lay-ups which are preferably continuously rolled off from a plurality of drums onto the belt or are placed on the bottom of a mold and optionally there form an appropriate number of layers.

The foam obtained is then preferably cured on the belt or in the mold to such an extent that it can be cut into pieces without damage. This can be carried out at room temperature or elevated temperatures, for example during passage through an oven in the case of continuous production or by the use of heatable molds in the case of discontinuous production. The foam pieces obtained are then preferably stored for a further time to attain full mechanical strength. The number of fiberglass mats used can be chosen freely and depends on the desired proportion of fiberglass in the foam and on the set foam height over which the mats become homogeneously distributed. For a foam height of 20-25 cm, preference is given to, for example, from 3 to 10 mat layers having a mat density of about 450 g/m$^2$, in particular 5-8 mat layers.

Isocyanates (a) and compounds (b) having groups which are reactive toward isocyanate, blowing agents comprising water (c), catalysts (d) and optionally further additives (e) are preferably reacted in such amounts that the isocyanate index is in the range from 100 to 400, preferably 100-200, particularly preferably 100-150.

For the purposes of the present invention, the isocyanate index is the stoichiometric ratio of isocyanate groups to groups which are reactive toward isocyanate, multiplied by 100. Groups which are reactive toward isocyanate are here all groups which are reactive toward isocyanate and are present in the reaction mixture, including chemical blowing agents but not the isocyanate group itself.

It is particularly advantageous that the reaction mixtures according to the invention penetrate quickly into the reinforcing materials and thus aid uniform and very space-filling distribution of the reinforcing materials in the rigid polyurethane foam obtained. The long cream time of the reaction mixtures according to the invention combined with a short reaction time is likewise advantageous. A further advantage is that the reaction mixtures according to the invention have a low viscosity and good flow behavior in order to fill large-area molds right to the corners.

Reinforced and in particular coated rigid polyurethane foams according to the invention are mechanically stable, have a low thermal conductivity, display excellent foam properties, for example no holes and cracks, have good mechanical properties such as compressive strength and impact strength and an excellent compressive E modulus and have a uniform distribution of the layers of reinforcing materials. The composite systems of the invention also have excellent UV resistance. Here, the compressive strength and the compressive E modulus are measured both perpendicular to and parallel to the foaming direction (in x/y and z direction) in accordance with DIN 53421/DIN EN ISO 604. The compressive strength and compressive E modulus averaged over space can be calculated according to $(x*y*z)^{1/3}$. The flexural strength is determined on test specimens having dimensions of 120 mm×25 mm×20 mm in accordance with DIN 53423 at 25° C.; the flexural strength of the foam plane perpendicular to the foaming direction is measured. The rigid polyurethane foam according to the invention can be produced as a block and foam bodies for the specific applications can be cut or milled from the block. In particular, more than one foam body can be obtained from a relatively large foam block. This makes foam body shapes of any complexity readily possible and also allows individual manufacture of short runs or individual pieces of the foam according to the invention.

The rigid polyurethane foam according to the invention is coated with a coating material for producing a compact polyurethane, a compact polyurea or a polyurethane-polyurea hybrid system. Here, any reaction product which is obtained by reaction of at least one compound having at least two isocyanate groups and a compound having at least two groups which are reactive toward isocyanates and is essentially free of gas inclusions can be used as coating, coating material comprising or consisting of compact polyurethane or as compact polyurea. The density of a compact polyurethane or a compact polyurea is preferably greater than 0.8 g/cm$^3$, particularly preferably greater than 0.9 g/cm$^3$ and in particular greater than 1.0 g/cm$^3$. Here, the term "polyurethane" refers to compounds which can be obtained when the reactive groups of the compound having at least two groups which are reactive toward isocyanates are predominantly hydroxyl groups and the term polyurea refers to compounds which can be obtained when the reactive groups of the compound having at least two groups which are reactive toward isocyanates are predominantly primary or secondary amine groups. The amines are frequently mixed with further auxiliaries and additives to form an amine component before being reacted with the isocyanate.

Coating of the rigid polyurethane foam is preferably carried out in a casting or spray process, particularly preferably a spray process, in which the rigid polyurethane foam is sprayed with the reaction mixture for producing the coating. Optionally the polyurethane composite system of the invention can also be produced in a mold. For this purpose, the interior wall of the mold is sprayed in its entirety or partly with the reaction mixture for producing the coating and the reinforcing material and the reaction mixture for producing the rigid polyurethane foam are subsequently introduced into the mold and allowed to react to completion. It is here possible to use all known polyurethane or polyurea spray systems. Such systems are known, for example, from Becker/Braun, Kunststoffhandbuch No. 7, Polyurethane, chapter 10. Polyurea spray systems are described in detail in DE102004022683. Preference is given to using compact polyureas for coating the rigid polyurethane foam.

As compounds having at least two isocyanate groups for producing compact polyurethanes or polyureas according to the invention, it is possible to use, for example, all isocyanates described under (a). Prepolymers based on an isomer or isomer mixture of diphenylmethane diisocyanate (MDI) and polyetherols, for example polypropylene glycols, are preferably used as compounds having at least two isocyanate groups. These isocyanate prepolymers are prepared by reaction of in particular hydroxyl-terminated, also amine-terminated, polyethylene oxides or polypropylene oxides with the polyisocyanate. The prepolymers used according to the invention preferably have an isocyanate content of 10-25 percent by weight, particularly preferably 15-20 percent by weight, and a viscosity at 25° C. of not more than 2000 mPas, in particular 300-1000 mPas.

The amine component is usually a mixture of primary aliphatic polyetheramines and generally aromatic amine chain extenders.

The main constituent of the amine component of a polyurea formulation is a mixture of polyetheramines, i.e. amine-terminated bifunctional or higher-functional polyethylene oxides or polypropylene oxides having molecular weights in the range from 200 to 5000 g mol$^{-1}$. The aliphatic amines react more rapidly than the aromatic components of the chain extenders and serve primarily to produce the soft phase of the polyurea spray elastomers.

The chain extender which is usually used in polyurea formulations is diethyltoluenediamine (DETDA). As a component which is less reactive than aliphatic amines, DETDA determines the curing behavior of the system. To synthesize light-stable polyureas, aliphatic chain extenders are also used. The usually aromatic chain extenders are incorporated predominantly into the hard phase of the polyurea spray elastomers. Furthermore, the polyurea formulation can comprise further additives and auxiliaries as described under (e), in particular the above-described flame retardants and antifoams and/or water-absorbing additives such as zeolites. In a further embodiment of the invention, the coating can comprise short fibers having a length of less than 2 cm which are separately stored and sprayed in parallel with the reaction mixture or are suspended beforehand in one or more of the polyurea components.

The coating is applied to at least 30%, preferably at least 50%, particularly preferably at least 80% and in particular 100%, of the surface of the rigid polyurethane foam. Particular preference is given to coating all visible surfaces of the polyurethane composite system of the invention.

After coating with the compact polyurethane or polyurea, the polyurethane composite system can, for example, be coated further with decorative coatings. Thus, for example, a decorative paint can be applied. Furthermore, the polyurethane composite system can also be entirely or partly coated with a functional coating, for example an antislip coating.

Polyurethane composite systems according to the invention have not only a low weight but also excellent compressive strength, flexural strength, stiffness, impact toughness and surface quality. Furthermore, they have excellent thermal insulation properties and UV resistances. The polyurethane composite systems can be used, for example, in the production of sports articles such as tennis rackets, winter sports equipment or water sports equipment, for example surfboards or sports boats, furniture items such as tables, working surfaces or trade exhibition structures, or light and stable parts in vehicle construction, e.g. dividing walls, floor, roof and lining parts, loading area claddings for goods vehicles, outer walls of cooling containers, blades for wind turbines, parts of aircraft, e.g. ailerons or rudders, or in the building industry, for example as thermal insulation panels, in particular on the exterior of buildings or else as load-bearing component having insulating properties. In particular, surfboards, wind surfing boards and wind kite boards which have a low materials density and thus a high buoyancy in water and at the same time a high total hardness, surface hardness, stiffness and flexural strength can be produced using the polyurethane composite system of the invention.

The advantages of the invention will be illustrated with the aid of examples:

To produce the rigid foam 1 according to the invention, the polyurethane composite system 2 and the comparative example C1, the polyols used were stirred together with catalysts, stabilizer and blowing agent as per Table 1, subsequently mixed with the isocyanate and the reaction mixture was poured into a box having a base area of 225 mm×225 mm and foamed there. To produce the reinforced rigid foams, the reaction mixture was introduced into the same box which now comprised a number of layers of fiberglass mats of the type Unifilo U809-450. The reaction mixture penetrated into the mats and with the foam rising in the box the mats swelled and became distributed homogeneously over the entire height of the foam. A constant foam density of 45 g/l was set by means of the blowing agent. Coating of the rigid foam with a 1 mm thick layer was carried out using the polyurea spray system coating 1 as per Table 2.

Compressive strength and compressive E modulus were measured parallel to the foaming direction in accordance with DIN 53421 at 25° C. The surface hardness was measured using a Tiratest 2602 instrument using a hemispherical indenter having a diameter of 20 mm at 25° C. Here, the force required to press the indenter 10 mm into the test specimen parallel to the foaming direction is measured.

TABLE 1

| Example | 1 | 2 | C1 | C2 | C3 |
|---|---|---|---|---|---|
| Polyol 1 | 30 | 30 | 30 | 30 | 30 |
| Polyol 2 | 20 | 20 | 20 | 20 | 20 |
| Polyol 3 | 30 | 30 | 30 | 30 | 30 |
| Dipropylene glycol | 18 | 18 | 18 | 18 | 18 |
| Foam stabilizer | 2 | 2 | 2 | 2 | 2 |
| Water | 1.8 | 1.8 | 1.8 | 1.8 | 1.8 |
| Formic acid | 1.8 | 1.8 | 1.8 | 1.8 | 1.8 |
| Dimethylcyclohexylamine | 0.3 | 0.3 | 0.3 | 0.3 | 0.3 |
| Proportion by weight of fiberglass mats | 10% | 10% | 0% | 0% | 0% |
| Proportion by weight of short fibers (5 cm) | 0% | 0% | 0% | 10% | 10% |
| Isocyanate | 172 | 172 | 172 | 172 | 172 |
| Coating with coating 1 | No | Yes | No | No | Yes |
| Compressive strength [MPa] | 0.27 | 0.32 | 0.22 | n.d. | n.d. |
| Compressive E modulus [MPa] | 8.9 | 9.1 | 5.0 | n.d. | n.d. |
| Surface hardness [N] | 290 | 570 | 170 | 200 | 500 |
| Flexural strength [MPa] | 0.56 | n.d. | n.d. | n.d. | 0.3 |

TABLE 2

| Polyetheramine, MW 2000 | 60 |
|---|---|
| Polyetheramine, MW 400 | 20 |
| Diethyltoluenediamine | 20 |
| MDI-based prepolymer, NCO content 15% | 112 |

The following starting materials were used:
Polyol 1: sugar-based polyetherol, OH number=500 mg KOH/g, viscosity=8000 mPas
Polyol 2: glycerol-based polyetherol, OH number=400 mg KOH/g, viscosity=350 mPas
Polyol 3: polyesterol based on phthalic anhydride/diethylene glycol, OH number=300 mg KOH/g, viscosity=1000 mPas
Isocyanate: polymeric methylenedi(phenyl isocyanate) (PMDI), viscosity=200 mPas
The viscosity figures relate in each case to the viscosity at 25° C.
Stabilizer: silicone-comprising foam stabilizer from Evonik Goldschmidt GmbH Table 1 shows that rigid polyurethane composite systems according to the invention have high compressive strengths, in particular surface hardness, and high compressive E moduli.

The invention claimed is:
1. A polyurethane composite system, comprising:
a rigid polyurethane foam; and
a coating material comprising a compact polyurethane or a compact polyurea,
wherein the rigid polyurethane foam comprises at least two layers of a porous, at least two-dimensional reinforcing material,
wherein a maximum distance between two adjacent layers among one another or between an upper layer and an upper side of the foam or between a lower layer and an underside of the foam differs from the minimum distance between two layers among one another or between the upper layer and the upper side of the foam or between the lower layer and the underside of the foam by a factor of not more than 2, wherein the two-dimensional reinforcing material is homogenously distributed in the rigid polyurethane foam, wherein the rigid polyurethane foam has a density of from 30 g/l to 100 g/l, and wherein the rigid polyurethane foam has a density-independent compressive strength of at least $5*10^{-4}$ MPa*$(l/g)^{1.6}$.

2. The system of claim 1, wherein the reinforcing material is a fiberglass mat.

3. The system of claim 1, wherein the rigid polyurethane foam is obtained by a process comprising:
(I) mixing a) a polyisocyanate, b) a compound comprising a group which is reactive toward isocyanates, c) a blowing agent comprising water, d) a catalyst mixture comprising a tertiary amine, and optionally e) an further additive, to obtain a reaction mixture;
(II) applying the reaction mixture to a reinforcing material; and then
(III) curing the reaction mixture.

4. The system of claim 3, wherein the compound (b) comprises a first polyetherol (b1) having a functionality of 4 or more and a viscosity at 25° C. of 10 000 mPas or less, and a second polyetherol (b2) having a functionality of 3.5 or less and a viscosity at 25° C. of 600 mPas or less.

5. The system of claim 4, wherein the compound (b) further comprises a third polyesterol (b3) having a viscosity at 25° C. of 2000 mPas or less, a chain extender (b4), and optionally, a crosslinker (b5).

6. The system of claim 1, wherein the rigid polyurethane foam comprises an isocyanate component comprising PMDI.

7. The system of claim 1, wherein the rigid polyurethane foam has a density-independent compressive E modulus of at least $8*10^{-3}$ MPa*$(l/g)^{1.7}$.

8. The system of claim 1, wherein the coating material is a compact polyurea obtained by mixing a first compound comprising at least two isocyanate groups with a second compound comprising at least two primary or secondary amino groups.

9. A sports article, a vehicle construction part, a cooling container, a wind turbine blade, an aircraft part, a furniture item, or a building industry component comprising:
the polyurethane composite system of claim 1.

10. The system of claim 1, wherein the rigid polyurethane foam has a density-independent compressive strength of at least $5.5*10^{-4}$ MPa*$(l/g)^{1.6}$.

11. The system of claim 1, wherein the rigid polyurethane foam has a density-independent compressive E modulus of at least $9.5*10^{-3}$ MPa*$(l/g)^{1.7}$.

12. The system of claim 1, wherein
a maximum distance between two adjacent layers among one another or between an upper layer and an upper side of the foam or between a lower layer and an underside of the foam differs from the minimum distance between two layers among one another or between the upper layer and the upper side of the foam or between the lower layer and the underside of the foam by a factor of not more than 1.5.

13. The system of claim 1, wherein the rigid polyurethane foam has a density of from 40 g/l to 60 g/l.

14. The system of claim 1, wherein the rigid polyurethane foam exhibits a combined compressive strength and compressive E-modulus value of from 9.17 to 9.42 MPa.

15. A process for producing the polyurethane composite system of claim 1, the process comprising:
coating the rigid polyurethane foam with the compact polyurethane or the compact polyurea.

16. The process of claim 15, wherein the coating comprises spraying a reaction mixture, which produces the compact polyurethane or the compact polyurea, onto the rigid polyurethane foam.

17. A process for producing the polyurethane composite system of claim 1, the process comprising:
spraying a first reaction mixture, which produces the compact polyurethane or the compact polyurea onto a part of or an entire surface of a mold; and then
adding the reinforcing material and a second reaction mixture, which produces the rigid polyurethane foam, into the mold and reacting the first and second reaction to completion.

* * * * *

UNITED STATES PATENT AND TRADEMARK OFFICE
CERTIFICATE OF CORRECTION

PATENT NO. : 10,125,230 B2
APPLICATION NO. : 13/516880
DATED : November 13, 2018
INVENTOR(S) : Frank Prissok et al.

It is certified that error appears in the above-identified patent and that said Letters Patent is hereby corrected as shown below:

In the Specification

Column 7, Line 53, "clibromopropyl" should read --dibromopropyl--

Column 8, Line 13, "alkyicresols" should read --alkylcresols--

Column 8, Lines 14-15, "toluedine" should read --toluidine--

Column 8, Line 18, "alkyicresols" should read --alkylcresols--

Column 8, Line 20, "toluedine" should read --toluidine--

Signed and Sealed this
Twenty-first Day of April, 2020

Andrei Iancu
*Director of the United States Patent and Trademark Office*